United States Patent [19]

Herzog

[11] Patent Number: 4,825,450
[45] Date of Patent: Apr. 25, 1989

[54] BINARY DATA COMMUNICATION SYSTEM

[75] Inventor: Hans K. Herzog, Bellevue, Wash.

[73] Assignee: The Boeing Company, Seattle, Wash.

[21] Appl. No.: 25,131

[22] Filed: Mar. 12, 1987

[51] Int. Cl.[4] ............................................. H04L 25/34
[52] U.S. Cl. ........................................ 375/17; 375/36; 375/55
[58] Field of Search .................. 375/17, 20, 36, 37, 375/52, 55, 57, 59, 75, 85; 370/85; 178/63 R, 63 B, 63 C, 64; 360/40, 41, 45; 340/825.6

[56] References Cited

U.S. PATENT DOCUMENTS

| | | | |
|---|---|---|---|
| 3,108,265 | 10/1963 | Moe | 375/17 |
| 3,187,260 | 6/1965 | Dove | 375/36 |
| 3,369,181 | 2/1968 | Braymer | 375/17 |
| 3,394,313 | 7/1968 | Ellis et al. | 375/55 |
| 3,465,101 | 9/1969 | Christian et al. | 375/36 |
| 3,597,733 | 8/1971 | Foxwell | |
| 3,744,051 | 7/1973 | Sanders et al. | 375/36 |
| 3,798,608 | 3/1974 | Huebner | 325/36 |
| 3,936,602 | 2/1976 | Korver | 370/27 |
| 3,956,717 | 5/1976 | Fisher et al. | 333/11 |
| 4,121,118 | 10/1978 | Miyazaki | 375/17 |
| 4,121,295 | 10/1978 | Witt | 375/11 |
| 4,178,569 | 12/1979 | Reutter et al. | 333/119 |
| 4,199,663 | 4/1980 | Herzog | 370/85 |
| 4,202,017 | 5/1980 | Geffon et al. | 360/45 |
| 4,244,008 | 1/1981 | Holt | 360/45 |
| 4,264,827 | 4/1981 | Herzog | 307/17 |
| 4,280,221 | 7/1981 | Chun et al. | 375/17 |
| 4,283,786 | 8/1981 | Okamura | 375/34 |
| 4,337,465 | 6/1982 | Spracklen et al. | 340/825.03 |
| 4,471,481 | 9/1984 | Shaw et al. | 370/85 |
| 4,555,681 | 11/1985 | Dominick et al. | 333/112 |
| 4,596,023 | 6/1986 | Driver et al. | 375/55 |
| 4,615,039 | 9/1986 | Li et al. | 375/36 |
| 4,622,535 | 11/1986 | Ise et al. | 340/310 R |
| 4,627,073 | 12/1986 | Shepperd et al. | 375/20 |
| 4,630,284 | 12/1986 | Cooperman | 375/36 |
| 4,631,733 | 12/1986 | Spiesman | 375/7 |

FOREIGN PATENT DOCUMENTS 079527  5/1983  European Pat. Off. .

Primary Examiner—Benedict V. Safourek
Attorney, Agent, or Firm—Christensen, O'Connor, Johnson & Kindness

[57] ABSTRACT

A method and apparatus for communicating rectangular form binary data over a data bus is disclosed. Prior to being sent, the data is converted by transmit couplers from rectangular form into doublet form, i.e., a single high frequency sinusoidal doublet is created for each transition of the rectangular form data signal. The doublets are applied to the data bus, and receiver couplers connected to the bus change the data from doublet form back into its original rectangular form. Preferably, the data bus is a current mode data bus 31 formed by a pair of twisted wires. Transmit and receive couplers 37 and 39 connected to utilization devices 33 (i.e., devices that originate and/or use the binary data) couple the utilization devices 33 to the twisted wires via coupler transformers 47 and 49. Also, preferably, the data produced and used by the utilization devices 33 is in Manchester biphase form.

29 Claims, 9 Drawing Sheets

BINARY DATA COMMUNICATION SYSTEM

TECHNICAL AREA

This invention relates to binary data communication and, more particularly, to the communication of binary data between a plurality of terminals connected together via a common data bus.

BACKGROUND OF THE INVENTION

While this invention was developed for use in communicating data between various avionic systems and subsystems that need to share data, and is described in such an environment, it is to be understood that the invention can be utilized to communicate binary data in other environments. It is also to be understood that while the invention was developed for use with a current mode data bus, and is described in connection with such a bus, many of the aspects of the invention can be utilized in connection with other types of electric wire and other data buses to improve the operation thereof; in particular, voltage mode and optical data buses. Similarly, while the invention was developed for use in a data communication system wherein the binary data to be communicated is coded in Manchester biphase form, it is to be understood that the invention can be used with binary data coded in other rectangular forms, such as binary data coded in mark-space form.

In modern aircraft, it is desirable to integrate, as far as possible, the functions of previous wiring-independent avionic systems to permit an attendant reduction in the weight, space and power requirements of the avionic systems, and to permit a simplification in wiring between physically separated avionic systems or subsystems thereof. Such integration has been achieved by the use of a common data bus to which each avionic system, or a subsystem thereof, has access through an associated terminal, each of which is capable of transmitting and receiving data. Data transmitted on the data bus by one terminal associated with a particular system or subsystem can be received by the terminals associated with remaining systems or subsystems, thus eliminating the requirement for separate wiring interconnections between the systems or subsystems. In addition, data generated by a particular system or subsystem can be used by any other system or subsystem without the necessity of having to independently generate that data.

While various types of data communication systems have been developed for use onboard aircraft to communicate between avionic systems and subsystems, as Z described in U.S. Pat. Nos. 4,199,663 and 4,471,481, both entitled "Autonomous Terminal Data Communications System" and assigned to the assignee of the present application, the most desirable avionic data communication system is an autonomous terminal data communication system; in particular, an autonomous data terminal communication system that uses a current mode data bus. Items critical to the operation of a data communication system that utilizes a current mode data bus are the reliability of the bus cable and the efficiency and reliability associated with the way each terminal is coupled to the bus. Current mode data bus coupling efficiency and reliability is addressed in U.S. Pat. No. 4,264,827 entitled "Current Mode Data or Power Bus," also assigned to the assignee of the present application. The essence of the invention described in this patent is a coupling transformer having a ferrite core designed such that the core can be disassembled and the two wires of a bus formed by a pair of twisted wires placed around the legs Of the core in such a way that the magnetic path of the reassembled core surrounds the conductors. The arrangement is such that the bus wires form one of the windings of a transformer. The other winding is permanently installed On the core and is connected to the data transmitter and/or receiver electronics of a data terminal. The end result is the establishment of current coupling without the need to cut the bus wires or remove or perforate the insulation that surrounds the wires.

While a coupling transformer of the type described in U.S. Pat. No. 4,264,827 is highly reliable, in order to optimize the benefits of a data communication system using a current mode data bus and such transformers, it is necessary that the coupler transformer circuitry, i.e., the circuit that applies data signals to the transformer for application to the current mode data bus and the circuit that receives data signals from the transformer, meet certain criteria. These criteria can be best understood by considering certain similarities and differences between a voltage mode data bus and a current mode data bus formed of a pair of twisted wires. As illustrated in FIG. 1, signal propagation from point A towards the end of a bus formed of a pair of twisted wires is the same for a voltage mode data bus and a current mode data bus. That is, the signal propagates along the data bus from the point where it is applied, toward the end(s) of the bus. For best results, the output impedance of the data transmitter should equal the characteristic impedance of the bus. Further, the bus wires should be terminated by a resistor, $R_0$, whose impedance equals the characteristic impedance of the bus so that signal reflections are avoided.

As shown in FIG. 2, transmitted data signals, $V_c$, are applied to a voltage mode data bus across the bus wires. $V_c$ drives current $I_1$ through terminating resistor $R_1$ in one direction, and current $I_2$ through terminating resistor $R_2$ in the opposite direction. Thus, the total current flow created by $V_c$, i.e., $I_c$, is equal to $I_1$ plus $I_2$. As shown best in an equivalent circuit (FIG. 3), $R_1$ and $R_2$ are connected in parallel. If $R_1$ and $R_2$ are the same, they can both be set equal to $R_0$ whereby: $I_c = 2V_c/R_o$ and $I_1 = V_c/R_o$.

FIG. 4 illustrates a current mode data bus wherein half of the coupler voltage, $V_c$, is applied between points C and D located on one of the bus wires of a twisted wire pair that forms the data bus and the other half is applied between points E and F located on the other bus wire. The equivalent circuit is shown in FIG. 5. In this circuit $I_1 = I_2 = I_c$. Further, since $R_1$ and $R_2$ are in series, the following equations apply: $I_c = V_c/2R_o$ and $I_1 = V_c/2R_o$.

The foregoing discussion leads to certain conclusions about a current mode data bus. First, the voltage of signals applied to a current mode data bus must be twice the voltage of signals applied to a voltage mode data bus to create the same current level in both buses. Second, the output impedance of a current mode data bus signal source must be low when a signal is not being applied in order to avoid loading the data bus. Third, the input impedance of the signal receivers coupled to a current mode data bus must be low for the same reason, i.e., to avoid loading the data bus. The second and third conclusions follow from the fact that, rather than applying an impedance in parallel across the bus wires as in a voltage mode data bus coupler (FIGS. 2 and 3), a current mode data bus coupler applies a series impedance to the bus wires. Bus loading by a parallel impedance is avoided by making the impedance high. Bus loading by a series impedance is avoided by making the impedance low.

As will be better understood from the following description, the present invention provides a current mode data bus based data communication system that functions in accordance with the three criteria discussed above. More specifically, the invention provides transmit couplers that apply relatively high voltage data signals to the current mode data bus and have a low output impedance during inactive periods. The invention also provides receive couplers that have a low input impedance.

The preferred form of a current mode data bus based data communication system formed in accordance with the invention accomplishes the foregoing results in a way that minimizes weight and size by minimizing the volume and area of the core of the transformers of the transmit and receive couplers. Core volume is significant because core losses are a function of core volume. Up to the limiting factor of core saturation, minimizing core volume minimizes core losses. Core area with respect to core saturation is a function of signal frequency. Because a signal with some low frequency components will saturate a transformer core of fixed size before a signal with only higher frequency components, maintaining signal frequency high minimizes core area (and volume). A high signal frequency also minimizes signal drop in signal receiver circuits.

SUMMARY OF THE INVENTION

In accordance with this invention, a method and apparatus for communicating binary data over a data bus is provided. In the preferred form of the invention, the data bus is a current mode data bus. Prior to being transmitted, the binary data to be communicated is in rectangular form. Prior to being sent, the data is converted from rectangular form into doublet form, i.e., a single high frequency sinusoidal doublet is created for each transition of the rectangular wave data signal. The doublets are applied to the current mode data bus, and receivers connected to the bus change the data from doublet form back into its original rectangular form.

In accordance with further aspects of this invention, the current mode data bus is formed by a pair of twisted wires. Transmit and receive couplers connected to utilization devices (i.e., devices that originate and/or use the binary data) couple the utilization devices to the twisted wires. The transmit couplers convert binary data from rectangular form to doublet form and the receive couplers convert binary data from doublet form into rectangular form.

In accordance with further aspects of this invention, the rectangular wave signals produced by the utilization devices are in Manchester biphase form; and, the transmit coupler includes a stub driver and a line driver connected together by a shielded twisted pair, e.g., a stub of wires, which may be relatively long. The stub driver includes a digital logic circuit that converts the Manchester biphase data signals into a pair of juxtaposed pulses on separate lines, one pair for each transition of the Manchester biphase data signals. The pulse pairs are converted into a doublet by passing the pulses through the primary winding of a suitably wound and connected transformer. The secondary winding of the transformer is connected to the line driver via the stub. The line driver includes semiconductor switches that apply the doublets to a transformer that connects the transmit coupler to the current mode data bus. The turns ratio of the transmit coupler transformer is low and the line driver shorts the windings of the transformer with a low impedance load in the absence of a doublet. As a result, the load applied to the bus by the transmit coupler during inactive periods is minimized. In addition to minimizing loading by shorting with a low impedance load, the transmit coupler transformer allows a related receiver to listen while the transmit coupler is transmitting. This listen while talking aspect is important to allowing the utilization devices to recognize transmitter clashes, e.g., simultaneous transmission, which can occur when the data communications system is first turned on.

In accordance with other aspects of this invention, the receive coupler is connected to the current mode data bus by a transformer having a relatively large turns ratio. As a result, little energy is extracted from the current mode data bus. The receive coupler transformer is connected to a receiver amplifier having low input impedance and a high voltage gain. The amplified doublet pulses are transmitted by a short section of wire, e.g., a stub, to a stub receiver that converts the doublet data pulses into a Manchester biphase data signal that is identical to the original Manchester biphase data signal.

As will be readily appreciated from the foregoing description, the invention has a number of features, all of which result in an improved method and apparatus for communicating data between terminals connected to a data bus. While the invention was designed to improve data communication when the data bus is a current mode data bus, the invention can also be used to improve the data communication oapabilities of other types of data buses, namely voltage mode and optical data buses. Converting data from binary rectangular form into sinusoidal doublet form is particularly advantageous when utilized with electric wire data buses, e.g., current and voltage mode data buses, because the low frequency components inherent in a rectangular data signal are eliminated. As a result, the core volume and area of the transformers used to couple the doublet signals to and from such data buses can be minimized. Doublets have the further advantage that they create substantially no short term do offset. Also, the washout time constant for ac coupling is very short. While the invention is useful with rectangular wave signals other than Manchester biphase data signals, such as mark-space data signals, Manchester biphase data signals have certain advantages in data communication. Because Manchester biphase signals are formed by a pair of complementary signals, each of which contains all of the data being communicated, in essence, a parity bit exists for each data bit. Further, a coupler designed to function with Manchester biphase signals is inherently compatible with military and other avionic binary data communication systems designed to transmit and receive Manchester biphase data signals.

BRIEF DESCRIPTION OF THE DRAWINGS

The foregoing and other features and advantages of the present invention will become more readily appreciated as the same becomes better understood by reference to the following detailed description when taken in conjunction with the accompanying drawings wherein.

DESCRIPTION OF THE PREFERRED EMBODIMENT

Figure 1:
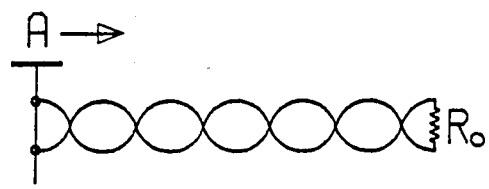
FIG. 1 is a pictorial view of a data bus formed of a pair of twisted wires.
Figure 2:
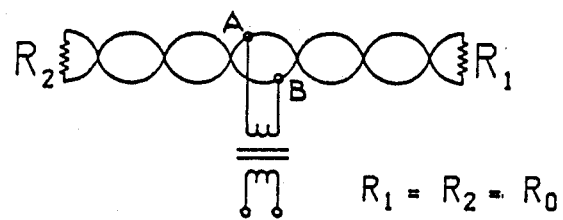
FIG. 2 is a pictorials view of a voltage mode data bus formed of a pair of twisted wires.
Figure 3:
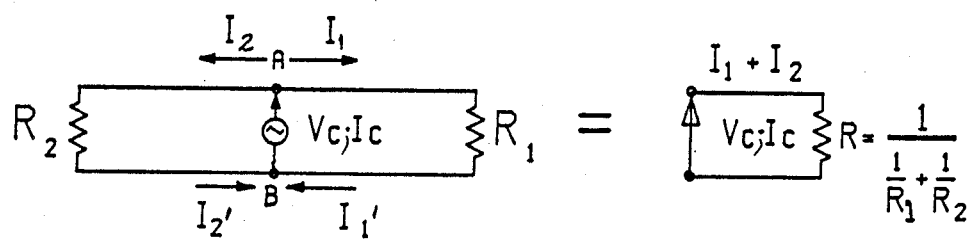
FIG. 3 is an equivalent circuit of the voltage mode data bus illustrated in FIG. 2.
Figure 4:
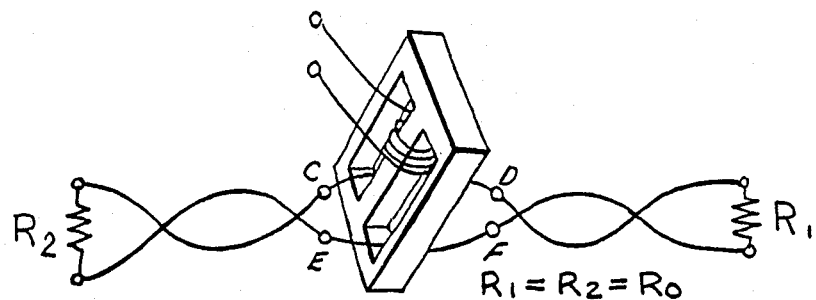
FIG. 4 is a pictorial view of a current mode data bus formed of a pair of twisted wires.
Figure 5:
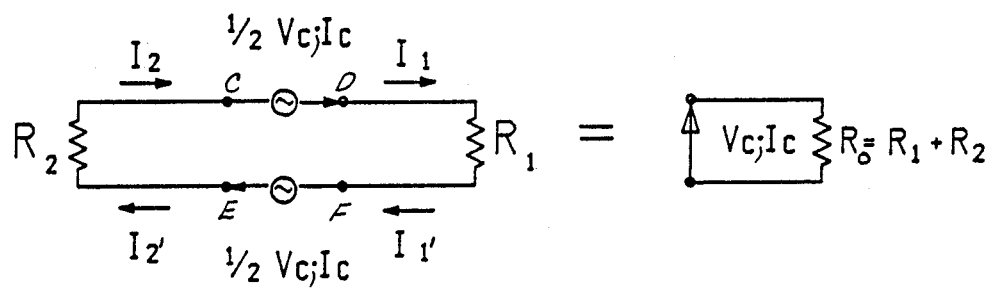
FIG. 5 is an equivalent circuit of the current mode data bus illustrated in FIG. 4.
Figure 6:
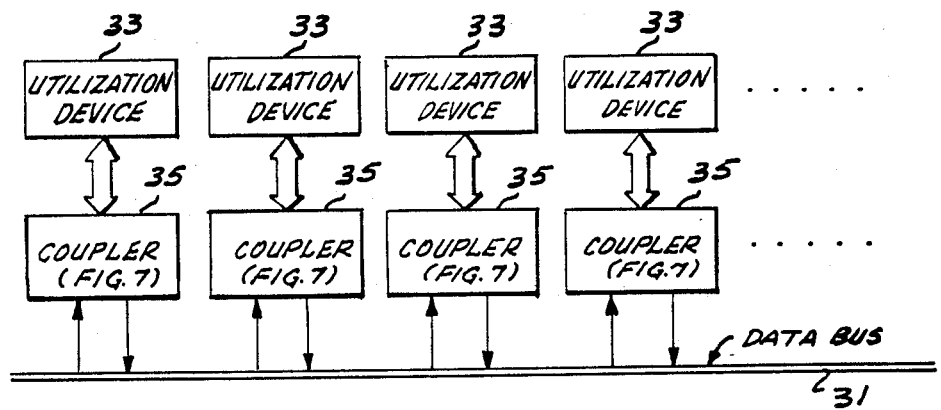
FIG. 6 is a block diagram of a data communication system formed in accordance with the invention.

FIG. 6 illustrates a data communication system formed in accordance with the invention that includes a data bus 31; and, a plurality of utilization devices 33, each connected to the data bus by a coupler 35. The binary data signals flowing between the utilization devices and the respective couplers are in rectangular form. Preferably, the data signals are Manchester biphase data signals. Further, preferably the data bus is a current mode data bus formed by a pair of twisted wires. The couplers 35 convert the binary data to be applied to the data bus from rectangular form to doublet form. More specifically, preferably the couplers convert data signals generated by the utilization devices from rectangular form into a form in which a doublet occurs for each transition of the binary data; and, apply the doublets to the data bus 31. Data signals received by the couplers are converted by the couplers 35 from doublet form into rectangular form. While FIG. 6 depicts all couplers as having the ability to both transmit and receive data, it is to be understood that couplers associated with utilization devices that only transmit or only receive data only require a coupler having the related ability.

Figure 7:
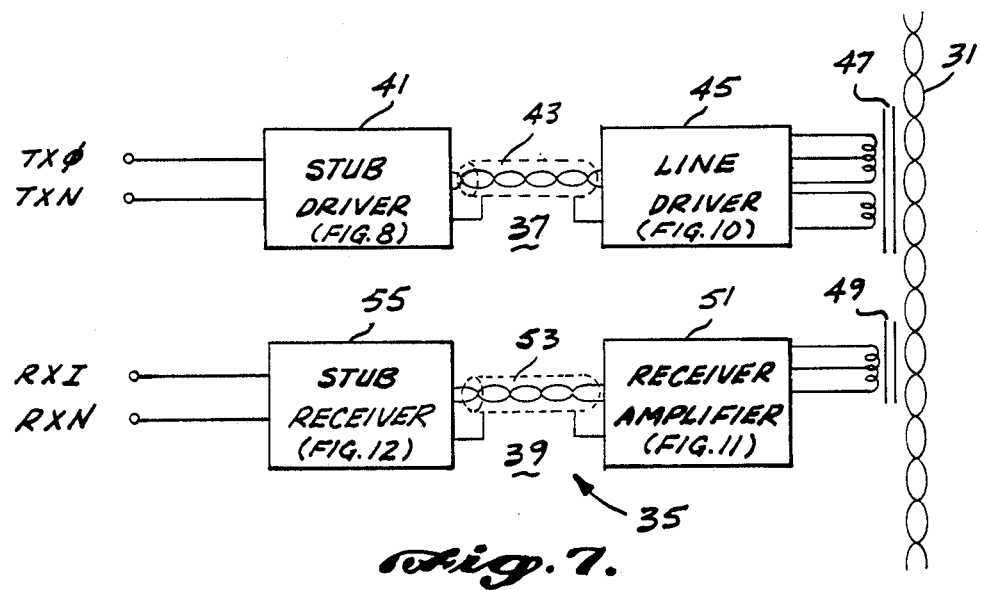
FIG. 7 is a block diagram of transmit and receive couplers formed in accordance with the invention and suitable for use in the data communication system illustrated in FIG. 6.

A coupler 35 formed in accordance with the invention having the ability to both transmit and receive data is illustrated in FIG. 7. The transmit ability is provided by a transmit coupler 37, and the receive ability is provided by a receive coupler 39.

The transmit coupler 37 is connected to the related utilization device 33, from which it receives Manchester biphase data signals designated TX0 and TXN. More specifically, the transmit coupler includes: a stub driver 41; a transmit stub 43, e.g., a shielded pair of wires, which may be up to fifty (50) feet long; a line driver 45; and, a transmit coupler transformer 47. As will be better understood from the following description, the stub driver 41 receives the TX0 and TX signals and converts them from Manchester biphase form into doublet form and, via the transmit stub 43, transmits the doublet coded binary signals to the line driver. The line driver 45 amplifies the doublets and applies the amplified result to the data bus via the transmit coupler transformer 47.

The receive coupler 39 receives data signals carried by the data bus 31 in doublet form, converts the signals into Manchester biphase form and applies the result, designated RXI and RXN, to the associated utilization device. More specifically, the receive coupler 39 includes: a receive coupler transformer 49; a receive amplifier 51; a receive stub 53, e.g., a shielded pair of wires, which may be up to fifty (50) feet long; and, a stub receiver 55. The receive coupler transformer 49 receives the binary data in doublet form carried by the data bus 31 and applies the doublets to the receive amplifier 5. The receive amplifier 51 converts the doublets into bipolar pulses, and amplifies the pulses. The bipolar pulses are applied to the stub receiver 55, which uses the pulses to reconstruct the original Manchester biphase coded signals as the RXI and RXN signals.

Both the transmit and receive stubs 43 and 53 are shielded, twisted wire pairs connected at either ends to low impedances, as described below. This arrangement allows relatively long stubs to be used (up to 50 feet in one actual embodiment of the invention). In addition to carrying signals, the transmit stub 43 carries power from the stub driver 41 to the line driver 45 and the receive stub 53 carries power from the stub receiver 55 to the receiver amplifier 51.

Figure 8:
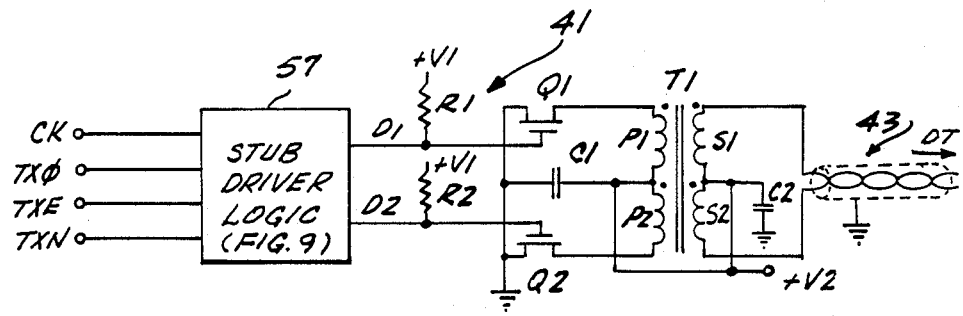
FIG. 8 is a partially block and partially schematic diagram of a stub driver suitable for use in the transmit coupler illustrated in FIG. 7.

FIG. 8 is a partially block and partially schematic diagram of a stub driver 41 suitable for use in the transmit coupler illustrated in FIG. 7. The stub driver illustrated in FIG. 8 includes: stub driver logic 43; two resistors designated R1 and R2; two MOSFETs (metal oxide semiconductor field effect transistors) designated Q1 and Q2; two capacitors designated C1 and C2; and, a transformer designated T1. T1 has two primary windings designated P1 and P2 and two secondary windings designated S1 and S2. Because T1 functions to combine two signals in a bipolar manner, the direction of the primary and secondary windings of T1 is important. As a result, in accordance with conventional symbology, the direction of the primary and secondary windings of T1 is denoted in FIG. 8 by dots located at one end of each winding.

Figure 9:
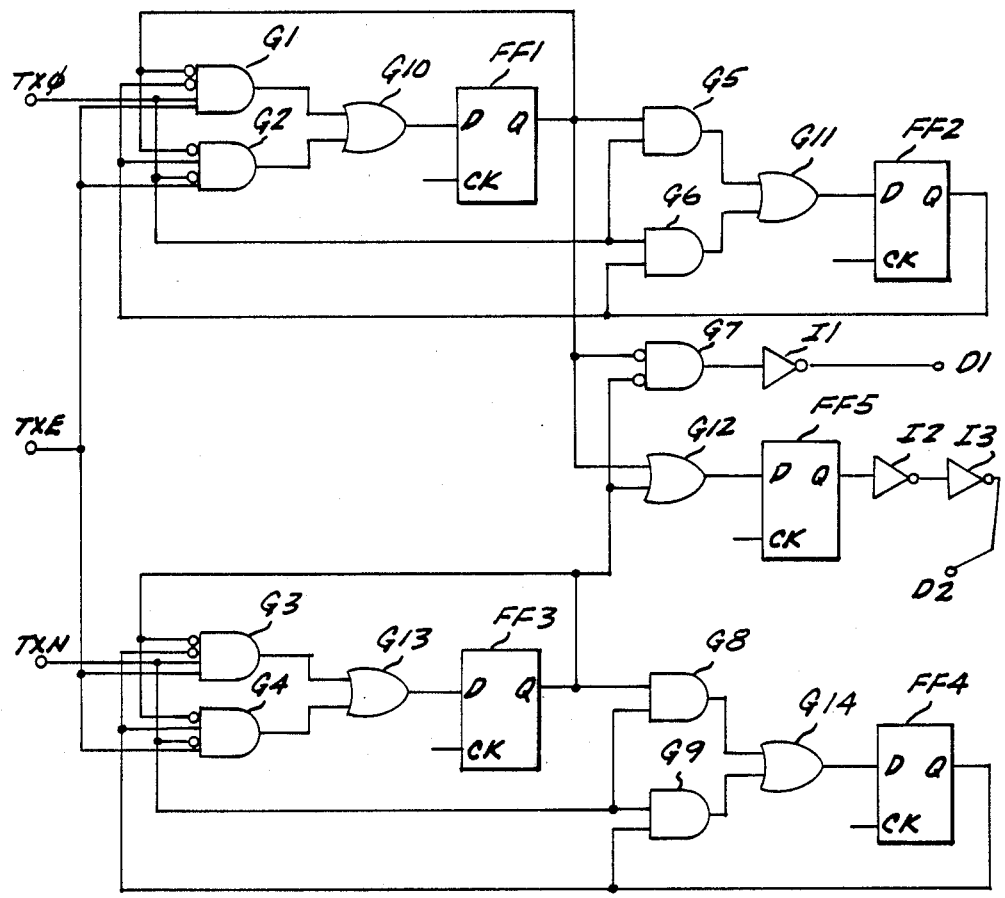
FIG. 9 is a block diagram of stub driver logic suitable for use in the stub driver illustrated in FIG. 8.

As will be better understood from the following discussion of FIG. 9, the stub driver logic 43 converts each transition of a Manchester biphase data signal into a pair of juxtaposed pulses on separate outputs. The pulses, designated D1 and D2, are juxtaposed in the sense that one of the pulses, D1, immediately precedes the other pulse, D2. The D1 pulses are applied to the gate terminal of Q1 and the D2 pulses are applied to the gate terminal of Q2. The gate terminal of Q1 is also connected through R1 to a positive voltage source designated +V1; and the gate terminal of Q2 is also connected through R2 to +V1. The source terminals of Q1 and Q2 are connected to ground. The drain terminal of Q1 is connected to the dot end of winding P1 of T1 and the drain terminal of Q2 is connected to the nondot end of winding P2 of T1. The dot end of P2 is connected to the nondot end of P1, and the junction between P1 and P2 is connected through both C1 and C2 to ground. The junction between P1 and P2 is also connected to a positive voltage source designated +V2. The dot end of winding S1 of T1 is connected to one end of one of the stub wires 43. The nondot end of S2 of T2 is connected to one end of the other stub wire. The dot end of S2 is connected to the nondot end of S1 and the junction between S1 and S2 is connected to +V2.

In operation, D1 and D2 switch Q1 and Q2 on and off to create an amplified current flow through T1 that corresponds to the D1 and D2 pulses. T1 converts the D1 and D2 pulses from single polarity form into bipolar form, i.e., creates a doublet, DT, from the bipolar pulses. Power for use by the line driver 45 (FIG. 10) is supplied by +V2 and transmitted to the line driver via S1 and S2, and the transmit stub wires.

As noted above, FIG. 9 is a block diagram of stub driver logic suitable for use in the stub driver 41 illustrated in FIG. 8. The stub driver logic illustrated in FIG. 9 includes: two four-input AND gates designated G1-G4; five two-input AND gates designated G5-G9; five two-input OR gates designated G10-G14; five D flip-flops designated FF1-FF5; and, three inverters designated I1-I3. While the logic illustrated in FIG. 9 can be embodied in discrete component form, preferably, it is implemented in PAL (Programmable Array Logic) form. In any event, FIG. 9 and the following logic diagrams all use conventional negation symbology. In this regard, each of the four-input AND gates G1-G4 has two negation inputs and both inputs of G7 are negation inputs.

An enable signal denoted TXE is applied to one input of each of G1-G4. TX0 is applied to one input of G1, one of the negation inputs of G2 and one of the inputs of each of G5 and G6. TXN is applied to one input of G3, one of the negation inputs of G4 and one input of each of G8 and G9. The outputs of G1 and G2 are each connected to one input of G10; and, the output of G10 is connected to the D input of FF1. The Q output of FF1 is applied to one of the negation inputs of G1, the second negation input of G2, the second input of G5, one of the negation inputs of G7, and one input of G12. The outputs of G5 and G6 are each connected to one input of G11. The output of G11 is connected to the D input of FF2. The Q output of FF2 is connected to the second negation input of G1, the fourth input of G2 and the second input of G6.

The outputs of G3 and G4 are each connected to one input of G13, the output of G13 is connected to the D input of FF3. The Q output of FF3 is connected to one of the negation inputs of G3, the second negation input of G4, one input of G8, second negation input of G7 and the second input of G12. The outputs of G8 and G9 are each connected to one input of G14. The output of G14 is connected to the D input of FF4. The Q output of FF4 is connected to the second negation input of G3, the fourth input of G4 and the second input of G9.

The output of G7 is connected to the input of I1. The signal previously denoted D1, and illustrated in FIG. 8, occurs on the output of I1. The output of G12 is connected to the D input of FF5. The Q output of FF5 is connected to the input of I2. The output of I2 is connected to the input of I3. The signal denoted D2, and illustrated in FIG. 8 and previously described, occurs on the output of I3. Clock pulses generated by a suitable clock pulse generator (not shown), are applied to the clock (CK) inputs of each of FF1, FF2, FF3, FF4 and FF5.

Figure 14:
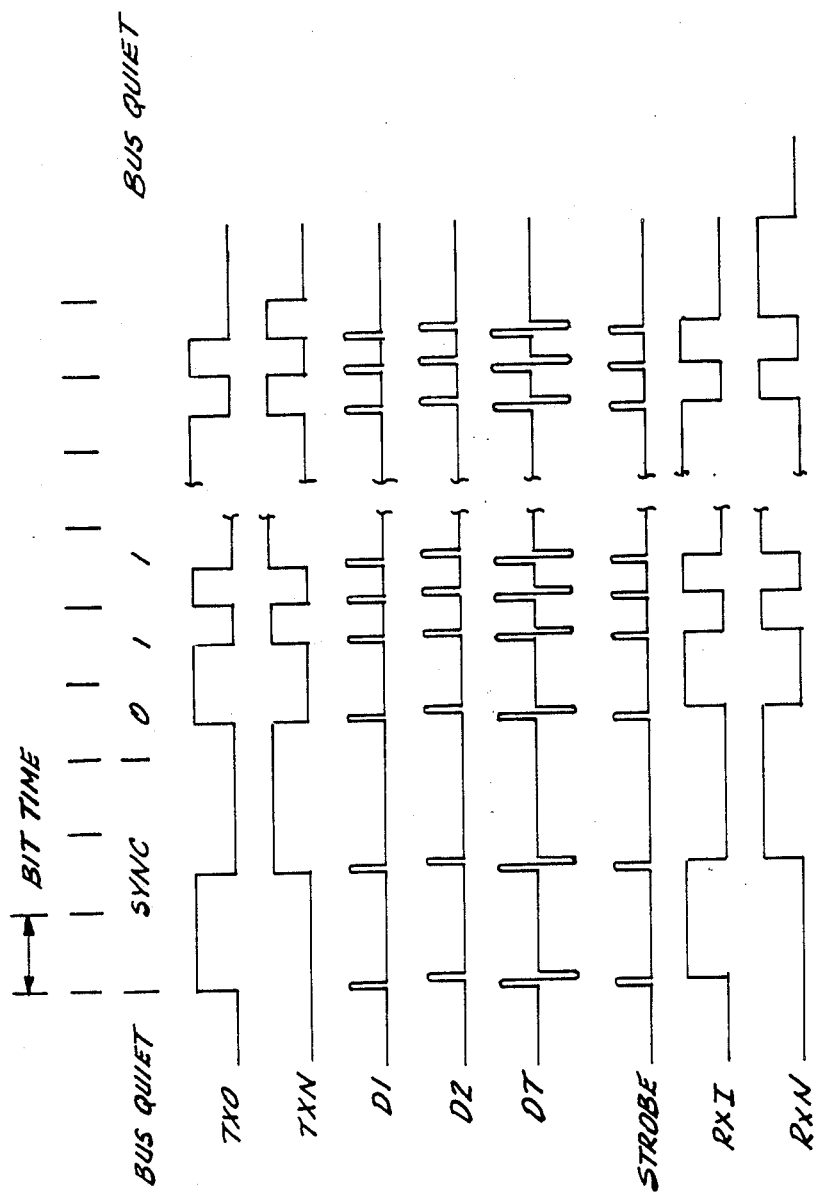
FIG. 14 is a series of waveform diagrams illustrating the form of signals at various points in the transmit and receive coupler circuits illustrated in FIGS. 8-13.

The lines designated TX0 and TXN of FIG. 14 is an exemplary illustration of Manchester biphase data signals of the type whose transition are converted by the stub driver logic illustrated in FIG. 9 into pairs of juxtaposed D1 and D2 pulses. As shown there, when no Manchester biphase data signals are present, denoted as the bus quiet state, TX0 and TXN are both in the same binary state, e.g., they are both low. A data word begins with a sync signal, which takes up three bit times and forms an "illegal" Manchester code, followed by a series of data bits. During the first half of the sync signal, TX0 changes to the binary state opposite its bus quiet state i.e., it goes high, while TXN remains in its bus quiet state. At the midpoint of the sync signal—the middle of the third bit time, TX0 and TXN both change states, i.e., TX0 shifts from a high state to a low state and TXN shifts from a low state to a high state. Thus, TX0 and TXN are placed in their biphase states. Following the sync period, conventional Manchester biphase codes representing "0" and "1" are produced as determined by the content of the data word. As depicted in the third and fourth lines of FIG. 14, D1 and D2 pulses are produced for each transition of either (or both) TX0 or TXN. D1, in essence, is coincident with the transition and D2 immediately follows D1. As previously discussed, D1 and D2 have the same polarity. D1 and D2 have a pulse width equal to one clock period, CK. As previously discussed above with respect to FIG. 8, the D1 and D2 pulses are amplified by Q1 and Q2 and converted by T1 from adjacent pulse form into doublet (DT) form, as shown on the fifth line of FIG. 14.

Figure 10:
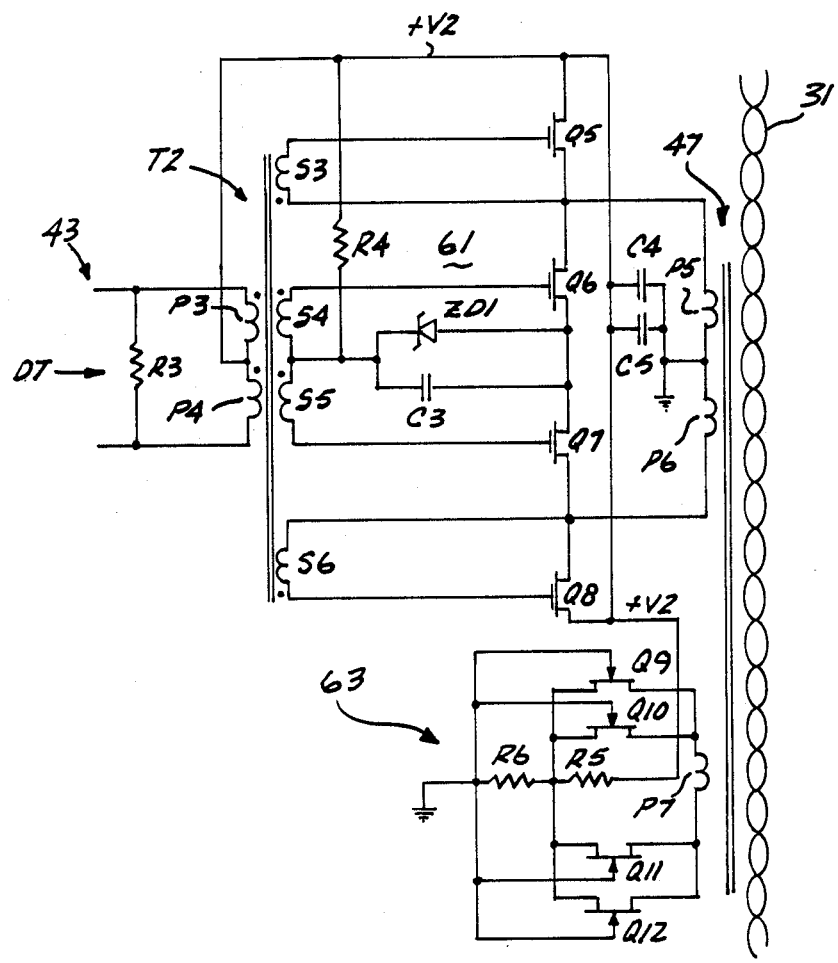
FIG. 10 is a schematic diagram of a line driver suitable for use in the transmit coupler illustrated in FIG. 7.

FIG. 10 is a schematic diagram of a line driver suitable for use in the transmit coupler illustrated in FIG. 7. The line driver illustrated in FIG. 10 includes two circuits—a coupling circuit 61 for applying the doublet signal, DT, to the transmit coupler transformer 47, and, a power off shorting circuit 63 for shorting the primary side of the transmit coupler transformer 47 in the event of a power loss.

The coupling circuit 61 comprises: two resistors designated R3 and R4; a transformer designated T2; four MOSFETs designated Q5, Q6, Q7 and Q8; a zener diode designated ZD1; and, three capacitors designated C3, C4 and C5. T2 has two primary windings designated P3 and P4 and four secondary windings designated S3, S4, S5 and S6. Because the T2 functions as a switch that controls the operation of Q5-Q8 in accordance with the state of the doublet signal, the winding direction of both the primary and secondary windings of T2 is important. As with T1, in accordance with conventional nomenclature, winding direction is denoted by dots located at one end of each of the windings of T2.

One of the stub wires 43 is connected to the dot end of P3. The nondot end of P3 is connected to the dot end of P4 and the nondot end of P4 is connected to the other stub wire. Consequently, P3 and P4 are connected in series. R3 is connected in parallel with P3 and P4. Power for the operation of the line driver, +V2, is provided at the junction between P3 and P4. The power is produced by the stub driver 41 and transmitted to the line driver 45 via the transmit stub 43 in the manner illustrated in FIG. 8 and described above.

The nondot end of S3 is connected to the gate terminal of Q5. The drain terminal of Q5 is connected to the junction between P3 and P4 and, thus, receives +V2 power. The source terminal of Q5 is connected to the dot end of S3 and to the drain terminal of Q6. The gate terminal of Q6 is connected to the dot end of S4. The source terminal of Q6 is connected to the source terminal of Q7. The gate terminal of Q7 is connected to the nondot end of Q5. The drain terminal of Q7 is connected to the source terminal of Q8 and to the nondot end of S6. The dot end of S6 is connected to the gate terminal of Q8. The drain terminal of Q8 is also connected to the junction between P3 and P4 and receives +V2 power. The junction between Q6 and Q7 is connected to the anode of ZD1 and to one side of C3. The cathode of ZD1 and the other side of C3 is connected to both the nondot end of S4 and to the dot end of S5. The nondot end of S4 and the dot end of S5 is also connected through R4 to the junction between P3 and P4, i.e., the +V2 power supply. C4 and C5 are connected in parallel, between the junction between P3 and P4, i.e., the +V2 power supply, and ground.

The transmit coupler transformer 47 has three primary windings designated P5, P6 and P7. Preferably, each of the primary windings is a two turn winding whereby the turns ratio between each of the primary windings and the data bus 31 is 2:1. Two of the primary windings, P5 and P6 are connected to the coupler circuit 61. More specifically, the junction between Q5 and Q6 is connected to one end of P5. The other end of P5 is connected to one end of P6. The other end of P6 is connected to the junction between Q7 and Q8. The junction between P5 and P6 is also connected to ground.

In the absence of a doublet, DT, being applied to the primary windings, P3 and P4, of T2, Q5 and Q8 are switched off and Q6 and Q7 are switched on and short P5 and P6. Q6 and Q7 are chosen to have relatively low drain to source resistance values—two ohms each, for example. Because the turns ratio connecting Q6 and Q7 to the data bus 31 is 4:1 (2:1+2:1) an impedance value of approximately one-fourth of an ohm is applied by windings P5 and P6 to the current data bus 31 in the absence of a doublet. Thus, when no data is being transmitted, the coupling circuit 61 creates a minimal load on the current mode data bus 31.

When a doublet, DT, is applied to T2, one of Q5 and Q8 switches on and one of Q6 and Q7 switches off for the first half of the doublet, followed by the other one of Q5 and Q8 switching on, and the other one of Q6 and Q7 switching off. As a result, an amplified doublet is applied to the current mode data bus 31 via the transmit coupler transformer 47. During the doublet transmission interval, switching one of Q6 and Q7 off is, of course, necessary to remove the shorting of P5 and P6 created by Q6 and Q7 during inactive periods.

The power off shorting circuit 63 comprises: two resistors designated R5 and R6; and, four depletion type JFETs (junction field effect transistors) designated Q9, Q10, Q11 and Q12. The drain terminals of Q9 and Q10 are connected to one end of the third primary winding, P7, of the transmit coupler transformer 47. The drain terminals of Q11 and Q12 are connected to the other end of P7. The gate terminals of Q9, Q10, Q11 and Q12 are all connected to ground. R5 is connected in series with R6 between +V2 and ground. The source terminals Q9, Q10, Q11 and Q12 are all connected to the junction between R5 and R6.

Q9, Q10, Q11 and Q12 are all turned off in the presence of +V2 power. If power to the transmit coupler is lost, i.e., +V2 drops to zero, Q9, Q10, Q11 and Q12 are all turned on. As a result, Q9, Q10, Q11 and Q12 are all connected in parallel with P7. Because Q9, Q10, Q11 and Q12 are all connected in parallel, the resistance they apply to P7 is low. This resistance can be lowered further by adding more JFETs in parallel with Q9, Q10, Q11 and Q12. The power turn off circuit 63 does not load the transmit coupler transformer 47 when a doublet is being applied to the current mode data bus 31 by the coupling circuit 61 because, during one swing of the doublet, either Q9 and Q10 or Q11 and Q12 do not conduct while the other two conduct, and vice versa, during the opposite polarity swing of the doublet. The nonconducting pair prevent current flow through P7 and, thus, loading by the power off shorting circuit 63.

Figure 11:
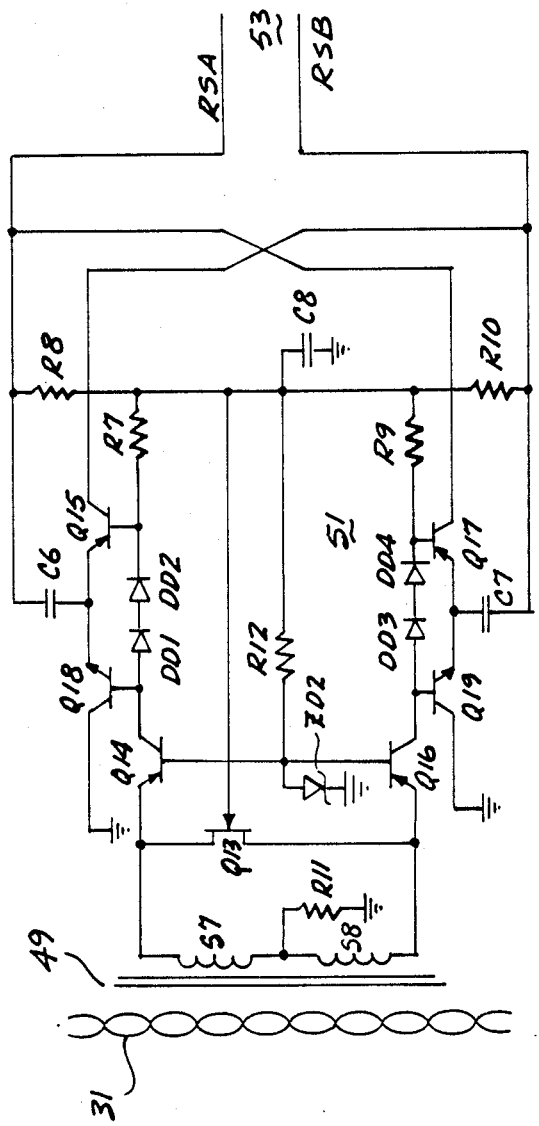
FIG. 11 is a schematic diagram of a receiver amplifier suitable for use in the receive coupler illustrated in FIG. 7.

FIG. 11 is a schematic diagram of a receiver amplifier 51 suitable for use in the receive coupler 39 illustrated in FIG. 7. The receiver amplifier illustrated in FIG. 11 comprises: a depletion type JFET designated Q13; four PNP transistors designated Q14, Q15, Q16 and Q17; two NPN transistors designated Q18 and Q19; four diodes designated DD1, DD2, DD3 and DD4; a zener diode designated ZD2; three capacitors designated C6, C7 and C8; and, five resistors designated R7, R8, R9, R10 and R11.

The primary winding of the receive coupler transformer 49 is formed by the current mode data bus 31. The receive coupler transformer 49 has two secondary windings designated S7 and S8. S7 and S8 are connected in series and the junction between S7 and S8 is connected through R11 to ground. The other end of S7 is connected to the source terminal of Q13 and to the emitter of Q14. The other end of S8 is connected to the drain terminal of Q13 and to the emitter of Q16. The collector of Q14 is connected to the base of Q18 and to the anode of DD1. The cathode of DD1 is connected to the anode of DD2. The cathode of DD2 is connected to the base of Q15 and to one end of R7. The other end of R7 is connected through R8 in series with C6 to the emitters of Q15 and Q18, and through C8 to ground. The collector of Q18 is connected to ground. The collector of Q15 is connected to one of the wires of the stub 53 and the junction between C6 and R8 is connected to the other wire. The wire connected to the junction between C6 and R8 carries a signal denoted RSA and the wire connected to the collector of Q15 carries a signal denoted RSB.

The collector of Q16 is connected to the base of Q19 and to the anode of DD3. The cathode of DD3 is connected to the anode of DD4 and the cathode of DD4 is connected to the base of Q17 and to one end of R9. The other end of R9 is connected through R10 in series with C7 to the emitters of Q17 and Q19 and through C8 to ground. The collector of Q19 is connected to ground. The collector of Q17 is connected to the same wire of the stub 53 as is the junction between C6 and R8, i.e., the wire that carries the RSA signal. The junction between R10 and C7 is connected to the same wire of the stub 53 as is the collector of Q15, i.e., the wire that carries the RSB signal. The junction between R7, R8, R9, R10 and C8 is also connected through R12 to the bases of Q14 and Q16. The bases of Q14 and Q16 are also connected to the anode of ZD2. The cathode of ZD2 is connected to ground.

The turns ratio between the secondary windings of the receive coupler transformer 49 is relatively high—20:1, for example. As a result, the amount of signal power extracted by the receive coupler transformer from the current mode data bus 31 is relatively small. A small signal current flowing in the secondary windings, S7 and S8, of the receive coupler transformer is amplified by low input impedance, grounded base transistor amplifiers formed by Q14 and Q16 and their related biasing components. The reverse voltage drop across ZD2 controls the bias voltage on the bases of Q14 and Q16. As a result, the total (quiescent) collector current flow of Q14 and Q16 does not change with the collector voltage changes that track doublet current flows through S7 and S8.

Q14 and Q16 in combination with R7 and R9 convert small current flow changes to relatively high voltage changes. In this regard, in one actual embodiment of the invention, the input impedance values of Q14 and Q16 were 30 ohms and the resistance values of R7 and R8 were 600 ohms. DD1 and DD2, and DD3 and DD4 overcome dead zone for the emitter follower drivers formed by Q18 and Q15, and Q19 and Q17, and their related biasing elements. In this regard, the forward voltage drop of DD1 and DD2, and DD3 and DD4, should be chosen to equal the base-emitter voltage drop of Q18 and Q15 and Q19 and Q17, respectively. Amplification power is provided by the stub receiver 55 illustrated in FIG. 12 and described below via the receive stub 53. Finally, Q13 is normally off. If power is lost, Q13 turns on and shorts S7 and S8. As a result, when power is lost, the load applied by the receive coupler to the current mode data bus 31 is minimized.

Figure 12:
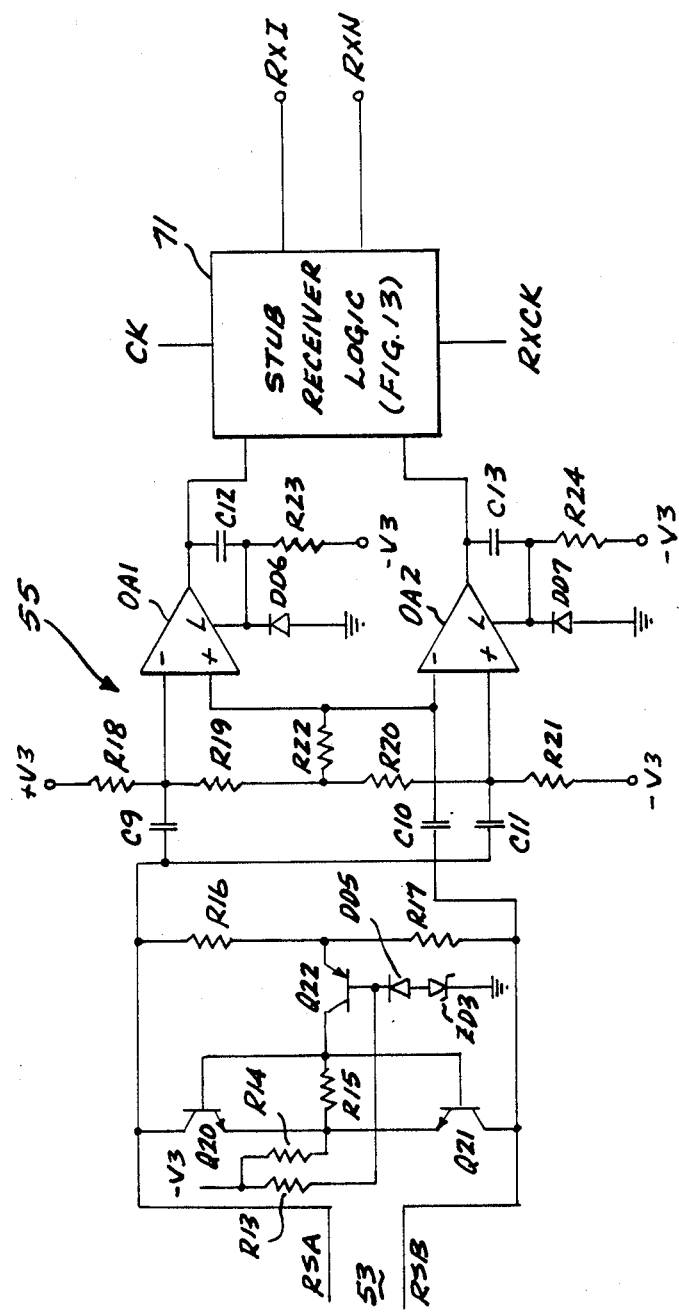
FIG. 12 is a partially schematic and partially block diagram of a stub receiver suitable for use in the receive coupler illustrated in FIG. 7.
Figure 13:
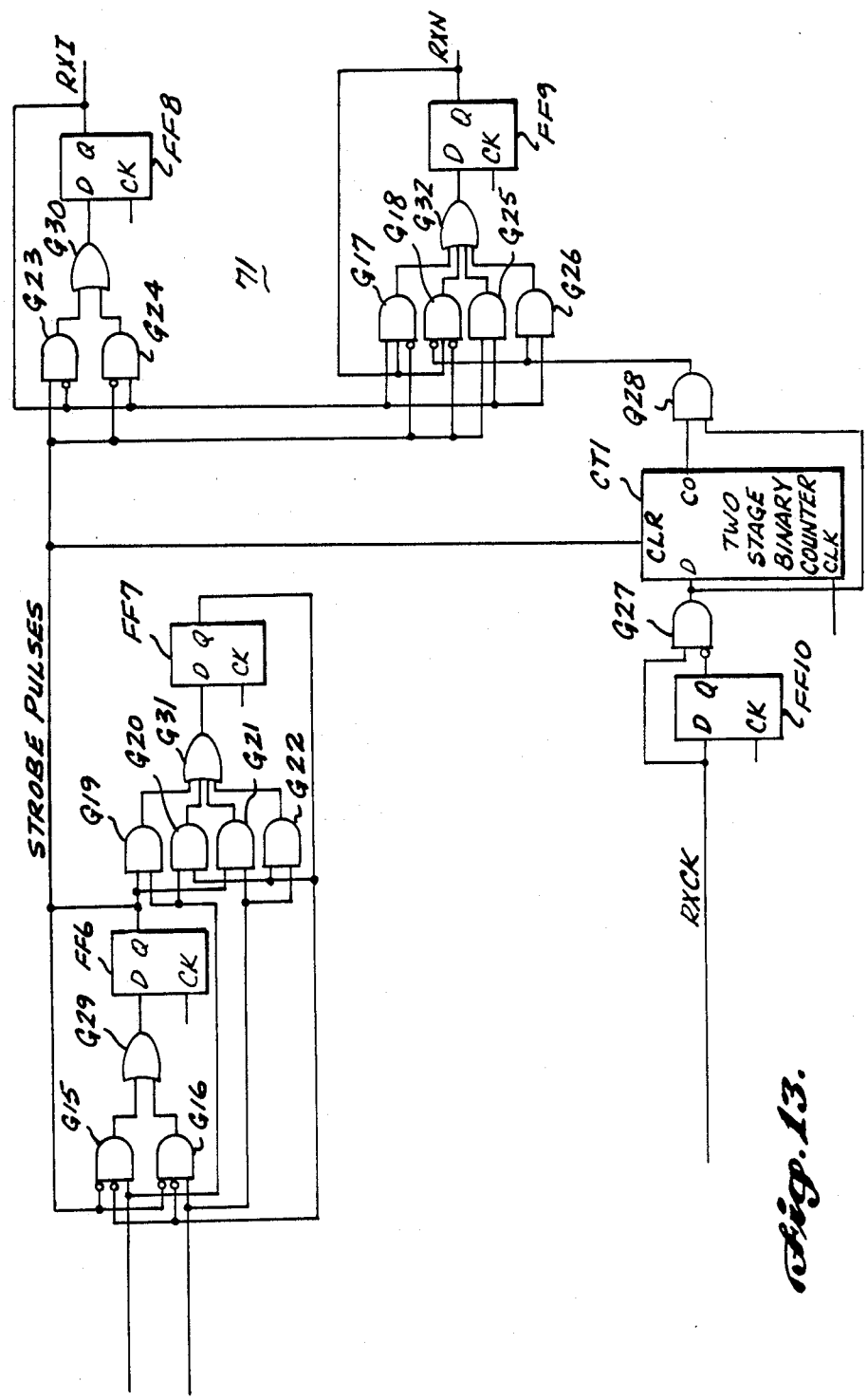
FIG. 13 is a block diagram of stub receiver logic suitable for use in the stub receiver illustrated in FIG. 12.

FIG. 12 is a schematic diagram of a stub receiver 55 suitable for use in the receive coupler 39 illustrated in FIG. 7 and described above. The stub receiver 55 illustrated in FIG. 12 comprises: two NPN transistors designated Q20 and Q21; a PNP transistor designated Q22; three diodes designated DD5, DD6, and DD7; a zener diode designated ZD3; five capacitors designated C9, C10, C11, C12 and C13; twelve resistors designated R13 through R24; two comparator amplifiers designated OA1 and OA2; and, stub receiver logic 71. Stub receiver logic is illustrated in FIG. 13 and described below.

The wire of the stub 53 carrying the RSA signal is connected to the collector of Q20, through C9 to the inverting input of OA1 and through C11 to the noninverting input of OA2. The wire of the stub 53 carrying the RSB signal is connected to the collector of Q21 and through C10 to the noninverting input of OA1 and the inverting input of OA2. The emitters of Q20 and Q21 are connected together and through R14 to a negative voltage source designated −V3. The bases of Q20 and Q21 are connected together, to the collector of Q22 and through R15 to the emitters of Q20 and Q21. The base of Q22 is connected through R13 to −V3 and to the cathode of DD5. The anode of DD5 is connected to the anode of ZD3 and the cathode of ZD3 is connected to ground. R16 and R17 are connected in series across the wires of the stub 53. The junction between R16 and R17 is connected to the emitter of Q22.

R18, R19, R20 and R22 are connected in that order between a positive voltage source designated +V3 and −V3. The magnitude of +V3 is equal to the magnitude of −V3. The junction between R18 and R19 is connected to the inverting input of OA1. The junction between R20 and R22 is connected to the noninverting input of OA2. The junction between R19 and R20 is connected through R22 to the noninverting input of OA1 and the inverting input of OA2. The output of OA1 is connected to one input of the stub receiver logic 71 and through C12 in series with R23 to −V3. The junction between C12 and R23 is connected to a latch input of OA1. The latch input of OA1 is also connected to the cathode of DD6. The anode of DD6 is connected to ground. The output of OA2 is connected to a second input of the stub receiver logic 71. The output of OA2 is connected through C13 in series with R24 to −V3. The junction between C13 and R24 is connected to the latch input of OA2. The latch input of OA2 is also connected to the cathode of DD7. The anode of DD7 is connected to ground.

R16 and R17 have equal values and their combined value is equal to the characteristic resistance of the stub 53. The voltage that powers the receiver amplifier (FIG. 11) is provided by −V3 through R14, Q20 and Q21. The magnitude of this voltage is controlled by ZD3 and Q22. Q20 and Q21 and R14 also form a fault sensing circuit. More specifically, these components sense an increase in the current drawn by the receiver amplifier via the wires of the receive stub 53. (Fault sensing circuits associated with the line driver 45, the transmit coupler transformer 47, the receive coupler transformer 49 and the receiver amplifier 51 can be used to switch a load resistor in parallel with C8 to create an increased current flow to the receiver amplifier to indicate the presence of a fault.) An increased current drain causes an increased voltage drop across R14 that can be utilized to actuate a detector to indicate that the data being reproduced by the receive coupler 39 is potentially erroneous and/or lead to a shutdown of the receive coupler 39.

In the absence of a doublet, the difference between the RSA and RSB signal wire voltages is zero. As a result of this zero difference and because the biasing network formed by R18, R19, R20 and R21 generates signal threshold voltages, VTH, at the inputs of OA1 and OA2, the outputs of OA1 and OA2 are low. When a doublet occurs, the RSA and RSB differential signal pulses are detected by OA1 and OA2 provided that the differential signal amplitude as coupled to the inputs of the OA1 and OA2 by C9, C10 and C11 exceeds the signal threshold, VTH. More specifically, OA1 detects RSB−RSA>VTH pulses, hereinafter called RSA pulses, and OA2 detects RSA−RSB>VTH pulses, hereinafter called RSB pulses. The output pulses are stretched by the latch inputs of OA1 and OA2.

In essence, the latch inputs cause the outputs of OA1 and OA2 to remain in a high state for a predetermined period of time after the RSA and RSB doublet created pulses end. The latching time constant is determined by the value of the OA1 and OA2 output circuit components C12, R23 and DD6, and C13, R24 and DD7, respectively. The time is chosen to provide an overlap between the stretched pulses. Thus, if an RSA pulse occurs before an RSB pulse, the output of OA1 remains high until the output of OA2 shifts high and vice versa if an RSB pulse occurs before an RSA pulse.

While a single comparator could, of course, be used to detect RSA or RSB pulses, dual comparators, i.e., OA1 and OA2, are used so that an output is produced at the earliest possible time after a doublet is detected. Thus, regardless of the polarity of the first pulse of a doublet, the output of one of OA1 or OA2 will switch states as soon as the earliest pulse of a doublet occurs.

As noted above, the latch inputs of OA1 and OA2 extend the period of the outputs of OA1 and OA2. The purpose of the extension is to further make certain that the outputs of OA1 and OA2 actuate the stub receiver logic. In this regard, as noted above, the first or second pulses of a doublet are approximately the width of a clock period. Because RSA and RSB pulses created by a doublet could be shorter than a clock period, a switch in the states of outputs of OA1 and OA2 that is only equal to the length of an RSA or RSB pulse might not be detected by the stub receiver logic. Extending the period of the square wave by utilizing the latch inputs of OA1 and OA2 prevents this possibility from occurring. A comparator amplifier used in one embodiment of the invention to form OA1 and OA2 is the LT1016 comparator amplifier produced by Linear Technology, 1630 McCarthy Boulevard, Milpita, Calif., 95035.

FIG. 13 is a block diagram Of stub receiver logic 71 suitable for use in the stub receiver 55 illustrated in FIG. 12. The stub receiver logic illustrated in FIG. 13 comprises: four three-input AND gates designated G15, G16, G17 and G18; ten two-input AND gates designated G19 through G28; two two-input OR gates designated G29 and G30; two four-input OR gates designated G31 and G32; five flip-flops designated FF6, FF7, FF8, FF9, and FF10; and, a two stage binary counter designated CT1. As with the previously described logic circuit, the logic circuit illustrated in FIG. 13 uses conventional negation symbology. In this regard, G15, G16 and G18 each have two negation inputs. G17, G23, G24 and G27 each have one negation input.

The output of OA1 (FIG. 12) is applied to one input of G15, one input of G19 and one input of G20. The output of OA2 is applied to one input of G16, one input of G21 and one input of G22. The outputs of G15 and G16 are each connected to one input of G29. The output of G29 is connected to the D input of FF6. The Q output of FF6 is applied to a negation input of G15, a negation input of G16, the second input of G19 and the second input of G21. The outputs of G19, G20, G21 and G22 are each applied to one input of G31. The output of G31 is applied to the D input of FF7. The Q output of FF7 is applied to the second negation input of G15, the second negation input of G16, the second input of G20 and the second input of G22.

The Q output of FF6 is also applied to one input of G23, the negation input of G24, the negation input of G17, the negation input of G18, one input of G25 and the clear input of CT1. The outputs of G23 and G24 are each connected to one input of G30. The output of G30 is connected to the D input of FF8. The Q output of FF8 (RXI) is applied to the negation input of G23, the second input of G24, an input of G17, one input of G25 and one input of G26. The outputs of G17, G18, G25, and G26 are each applied to one input of G32. The output of G32 is connected to the D input of FF7. The Q output of FF7 (RXN) is applied to the second input of G17 and an input of G18.

A serial data clock signal denoted RXCK, having a pulse rate equal to twice the data bit rate and a fixed phase relationship to the received data stream is applied to the D input of FF10 and one input of G27. The Q output of FF10 is applied to the negation input Of G27. The output of G27 is applied to the data (D) input of CT1 and to one input of G28. The carry (CO) output of CT1 is applied to the input of G28. The output of G28 is applied to the second negation input of G18 and to the second input of G26.

The stub receiver logic illustrated in the upper left-hand corner of FIG. 13, creates a strobe pulse in the clock domain for each doublet. This pulse occurs on the output of FF6. In essence, this logic is two channel logic that responds to which one of OA1 and OA2 first switches its output state from low to high in response to doublet created RSA and RSB pulses. If OA1 switches first, the resulting shift in output of G15 from a low state to a high state is clocked into FF6 to create a strobe pulse. If OA2 switches first, the resulting shift in the output of G16 from a low state to a high state is clocked into FF6 to create a strobe pulse. The creation of multiple strobe pulses for a single doublet are prevented by G19, G20 and FF7 in the case of a G15 created strobe pulse and G21, G22 and FF7 in the case Of a G16 created strobe pulse. More specifically, the clock pulse occurring after the output of FF6 shifts from low to high clocks the high output of FF6 into FF7 if the related OA1 or OA2 output is still high via one of G19, G20, G21 or G22. As a result, FF7 disables G15 and G16 for a clock pulse period after a strobe pulse ends.

The portion of the stub receiver logic located on the right side of FIG. 13, i.e., FF8 and FF9 and the gates associated therewith (G23, G24, G30, G17, G18, G25, G26 and G32), create Manchester biphase data signals identical to the Manchester biphase data signals that originally produced the doublets that created the strobe pulses. In this regard, FF8 toggles for each strobe pulse. FF9 follows FF8 and produces the complement of the output of FF8.

The circuit formed by FF10, G27, CT1 and G28 is a special counter circuit that forces the output of RXI and RXN to a bus quiet state in the absence of strobe pulses. More specifically, RXCK is a timing signal having a predetermined period. As noted above, the period may equal eight clock pulses and bear a fixed phase relationship with the received bit stream. RXCK is reclocked and differentiated by FF10 in combination with G27. While RXCK is a square wave, the output of G27 is a pulse that occurs on the rise of RXCK. The two stage binary counter, CT1, switches its carry (CO) output state after three pulses have occurred on the output of G27. G28, in essence, requires the production a fourth pulse before its output shifts from a low state to high state. When the output of G28 switches to a high state, which will only occur if no strobe pulses have cleared CT1, the output of FF9, RXN, is set to the same state as the output of FF8. As illustrated in FIG. 14, this state is the bus quiet state that occurs at the end of the RXI and RXN signals.

In summary, the illustrated and described embodiment of the invention provides a data communication system that transmits data over a current mode data bus in an efficient and highly reliable manner. The transmit couplers attached to the data bus produce a relatively high voltage, high frequency output signal. The high voltage allows the invention to be used with a relatively long data bus, in particular a data bus suitable for use on large commercial aircraft. Because the frequency of the doublet coded signal is relatively high, the area and volume of the transmit and receive coupler transformers can b made relatively low. Thus, the weight of such transformers can be minimized. Further, the circuitry that coacts with the transformers minimizes the load created by the transmit and receive couplers. The transmit coupler load is minimized by minimizing the resistance "seen" by the bus when doublets are not being transmitted. This feature has the further advantage of allowing the receive couplers to receive data doublets while the related transmitter is transmitting. This "listen while talking" feature allows the utilization devices to recognize and react to transmission clashes, which can occur when the data communication system is initially energized. The load created by the receive couplers is minimized by minimizing reflected series resistance. In addition, both the transmit and receive couplers are designed to short their respective transformer windings in the event of a power failure and, thus, avoid loading the bus if a power failure occurs.

While a preferred embodiment of the invention has been illustrated and described, it will be appreciated that various changes can be made therein without departing from the spirit and scope of the invention. For example, while the preferred data bus is a current mode data bus, it is to be understood that the data bus could be some other type of electric wire data bus, such as a voltage mode data bus, or an optical mode data bus. Like a current mode data bus, data communication system, a voltage mode data bus communication system incorporating the invention, can use small size transformers to couple terminals to the data bus because the doublet signals do not contain low frequency components. While the transformer size advantages will not be achieved in an optical mode data bus data communication system, because transformer coupling is not utilized, other advantages are achieved. For example, the amount of energy applied to the light emitting devices used in such a system to produce high intensity pulses is less than the amount of energy needed to produce mark-space signals. As a result, the energy conversion and, thus, the heat generated by the light emitting devices is significantly reduced. Because energy conversion and heat generation is reduced, the life of the light emitting devices is increased. Further, the production of pulses coincident with the transitions of mark-space signals allows the pulses to be utilized to automatically create complementary signals, such as Manchester biphase data signals in the manner outlined above. Consequently, the invention can be practiced otherwise than as specifically described herein.

The embodiments of the invention in which an exclusive property or privilege is claimed are defined as follows:

1. A binary data communication system comprising:
   a data bus;
   at least one transmit coupler for coupling to said data bus a source device that produces binary data signals in rectangular form, said at least one transmit coupler converting said rectangular form data signals into doublet form such that a doublet, coincident with each transition of said rectangular form data signal, is produced for each transition of said rectangular form data signal and applying said doublets to said data bus, the number of doublets produced being equal in number to the number of transitions of said rectangular form data signal; and,
   at least one receive coupler for coupling to said data bus a utilization device that responds to binary data signals in rectangular form, said at least one receive coupler receiving said doublets applied to said data bus by said at least one transmit coupler and converting said doublets into rectangular form data signals identical to the rectangular form data signals converted by said at least one transmit coupler into doublet form by creating a transition of said rectangular form data signal for each doublet.

2. A binary data communication system as claimed in claim 1, wherein said data bus is an electric wire data bus.

3. A binary data communication system as claimed in claim 2, wherein said rectangular form data signals produced by said source device coupled by said at least one transmit coupler to said electric wire data bus are in Manchester biphase form.

4. A binary data communication system as claimed in claim 3, wherein said transmit coupler comprises:
   a stub driver for converting said Manchester biphase data signals from rectangular form into doublets such that a doublet, coincident with each transition of said Manchester biphase data signals, is produced for each transition of said Manchester biphase data signals;
   a line driver connected to said stub driver for amplifying the doublets produced by said stub driver; and,
   a transmit coupler transformer for coupling said line driver to said electric wire data bus, said transmit coupler transformer including an input winding connected to said line driver so as to receive said amplified doublets produced by said line driver.

5. A binary data communication system as claimed in claim 4, wherein said stub driver comprises:
   a stub driver logic circuit connected to said source device coupled by said at least one transmit coupler to said electromagnetic data bus for producing a pair of juxtaposed pulses for each transition of the Manchester biphase data signals produced by said source device; and,
   a switching network for inverting one of said pair of pulses and combining said pair of pulses to create a doublet from each pair of pulses.

6. A binary data communication system as claimed in claim 5, wherein said line driver includes shorting means for shorting the input winding of said transmit coupler transformer to which said line driver is connected when a doublet is not being applied to said electric wire data bus by said line driver.

7. A binary data communication system as claimed in claim 6, wherein said line driver also includes a shorting circuit for shorting said transmit coupler transformer if power supplied to said line driver to amplify said doublets fails.

8. A binary data communication system as claimed in claim 5, wherein said at least one receive coupler comprises:
   a receive coupler transformer for coupling said electric wire data bus to a receiver amplifier, said receive coupler transformer including an output winding across which doublets carried by said electric wire data bus are formed;
   a receiver amplifier connected to said output winding of said receive coupler transformer for receiving and amplifying said doublets; and,
   a stub receiver connected to said receiver amplifier for converting the doublets received and amplified by said receiver amplifier into Manchester biphase data signals.

9. A binary data communication system as claimed in claim 8, wherein said receiver amplifier has an input stage and wherein the input impedance of said input stage is low.

10. A binary data communication system as claimed in claim 9, wherein said receiver amplifier includes means for shorting the output winding of said receive coupler transformer if the power applied to said receiver amplifier for amplifying said doublets is lost.

11. A binary data communication system as claimed in claim 2, wherein said electric wire data bus is a current mode data bus.

12. A binary data communication system as claimed in claim 11, wherein said rectangular form data signals produced by said source device coupled by said at least one transmit coupler to said current mode data bus are in Manchester biphase form.

13. A binary data communication system as claimed in claim 12, wherein said transmit coupler comprises:
- a stub driver for converting said Manchester biphase data signals form rectangular form into doublets such that a doublet, coincident with each transition of said Manchester biphase data signals, is produced for each transition of said Manchester biphase data signals;
- a line connected to said stub driver for amplifying the doublets produced by said stub driver; and,
- a transmit coupler transformer for coupling said line driver to said current mode data bus, said transmit coupler transformer including an input winding connected to said line driver so as to receive said amplifier doublet produced by said line driver.

14. A binary data communication system as claimed in claim 13, wherein said stub driver comprises:
- a stub driver logic circuit connected to said source coupled by said at least one transmit coupler to said current mode data bus for producing a pair of juxtaposed pulses for each transition of the Manchester biphase data signals produced by said source device; and,
- a switching network for inverting one of said pair of pulses and combining said pair of pulses to create a doublet from each pair of pulses.

15. A binary data communication system as claimed in claim 14, wherein said line driver includes shorting means for shorting the input winding of said transmit coupler transformer to which said line driver is connected when a doublet is not being applied to said current mode data bus by said line driver.

16. A binary data communication system as claimed in claim 15, wherein said line driver also includes a shorting circuit for shorting said transmit coupler transformer if power supplied to said line driver to amplify said doublet fails.

17. A binary data communication system as claimed in claim 14, wherein said at least one receive coupler comprises:
- a receive coupler transformer for coupling said current mode data bus to a receiver amplifier, said receive coupler transformer including an output winding across which doublets carried by said current mode data bus are formed;
- a receive amplifier connected to said output winding of said receive coupler transformer for receiving and amplifying said doublets; and
- a stub receiver connected to said receiver amplifier for converting the doublets received and amplified by said receiver amplifier into Manchester biphase data signals.

18. A binary data communication system as claimed in claim 17, wherein said receiver amplifier has an input stage and wherein the input impedance of said input stage is low.

19. A binary data communication system as claimed in claim 19, wherein said receiver amplifier includes means for shorting the output winding of said receive coupler transformer if the power supplied to said receiver amplifier for amplifying said doublets is lost.

20. A method of transmitting binary data produced and used in rectangular form over a data bus, said method comprising the steps of:
- converting binary data signals from rectangular form into doublet form such that a doublet coincident with each transition of said rectangular form is created for each transition of said rectangular form, the number of doublets produced being equal in number to the number of transitions of said rectangular form data signal;
- applying said doublet form of said binary data signals to a data bus at a first location on said data bus;
- receiving said doublet form of said binary data signals at a second location on said data bus spaced from said first location; and,
- converting said received doublet form of said binary data into rectangular form such that a transition of said rectangular form occurs for each received doublet.

21. The method of transmitting binary data as claimed in claim 20, wherein said doublets are created by: producing juxtaposed pulses of the same polarity; inverting one of the pulses; and combining the inverted pulse with the noninverted pulse.

22. The method of transmitting binary data as claimed in claim 21, wherein said pulse inverting and combining steps simultaneously occur.

23. A transmit coupler for a binary data communication system for coupling a source device to an electric wire data bus, said transmit coupler comprising:
- a stub driver for receiving mark-space data signals from a source device and converting said mark-space data signals into doublets such that a doublet, coincident with each transition of said mark-space binary data signals, is produced for each transition of said mark-space data signals, the number of doublets produced being equal in number to the number of transitions of said rectangular form data signal;
- a line driver connected to said stub driver for amplifying said doublets produced by said stub driver; and
- a transmit coupler transformer connected to said line driver for coupling said line driver in an electric wire data bus, said transmit coupler transformer including an input winding connected to said line driver so as to receive said amplified doublets produced by said line driver.

24. A transmit coupler as claimed in claim 23, wherein said stub driver comprises:
- a stub driver logic circuit connected to said source device coupled by said at least one transmit coupler to said electric wire data bus for producing a pair of juxtaposed pulses for each transition of the mark-spaced binary data signals produced by said source device; and,
- a switching network for inverting one of said pair of pulses and combining said pair of pulses to create a doublet for each pair of pulses.

25. A binary transmit coupler as claimed in claim 24, wherein said line driver includes shorting means for shorting the input winding of said transmit coupler transformer to which said line driver is connected when a doublet is not being applied to said electromagnetic data bus by said line driver.

26. A transmit coupler as claimed in claim 25, wherein said line driver also includes a shorting circuit for shorting said transmit coupler transformer is power supplied to said line driver to amplify said doublets fails.

27. A receive coupler for a binary data communication system that includes an electric wire data bus that carries binary data in doublet form, said receive coupler comprising:
- a receive coupler transformer for coupling an electric wire data bus to a receiver amplifier, said receive coupler transformer including an output winding across which doublets carried by said electric wire data bus are formed;
- a receive amplifier connected to said output winding of said receive coupler transformer for receiving and amplifying said doublets; and,
- a stub receiver connected to said receiver amplifier for receiving the doublets received and amplified by said receiver amplifier and converting said doublets into mark-space binary data signals such that a transition of said mark-space binary data signals occurs for each doublet received from said receiver amplifier.

28. A receive coupler as claimed in claim 27, wherein said receiver amplifier has an input stage and wherein the input impedance of said input stage is low.

29. A receive coupler as claimed in claim 28, wherein said receiver amplifier includes means for shorting the output winding of said receive coupler transformer if the power supplied to said receiver amplifier for amplifying said doublet pulses is lost.

* * * * *

UNITED STATES PATENT AND TRADEMARK OFFICE
CERTIFICATE OF CORRECTION

PATENT NO. : 4,825,450

DATED : April 25, 1989

INVENTOR(S) : Hans K. Herzog

It is certified that error appears in the above-identified patent and that said Letters Patent is hereby corrected as shown below:

Column 19, line 1: "is" should be --if--

Signed and Sealed this

Twenty-first Day of August, 1990

*Attest:*

HARRY F. MANBECK, JR.

*Attesting Officer*     *Commissioner of Patents and Trademarks*